UNITED STATES PATENT OFFICE.

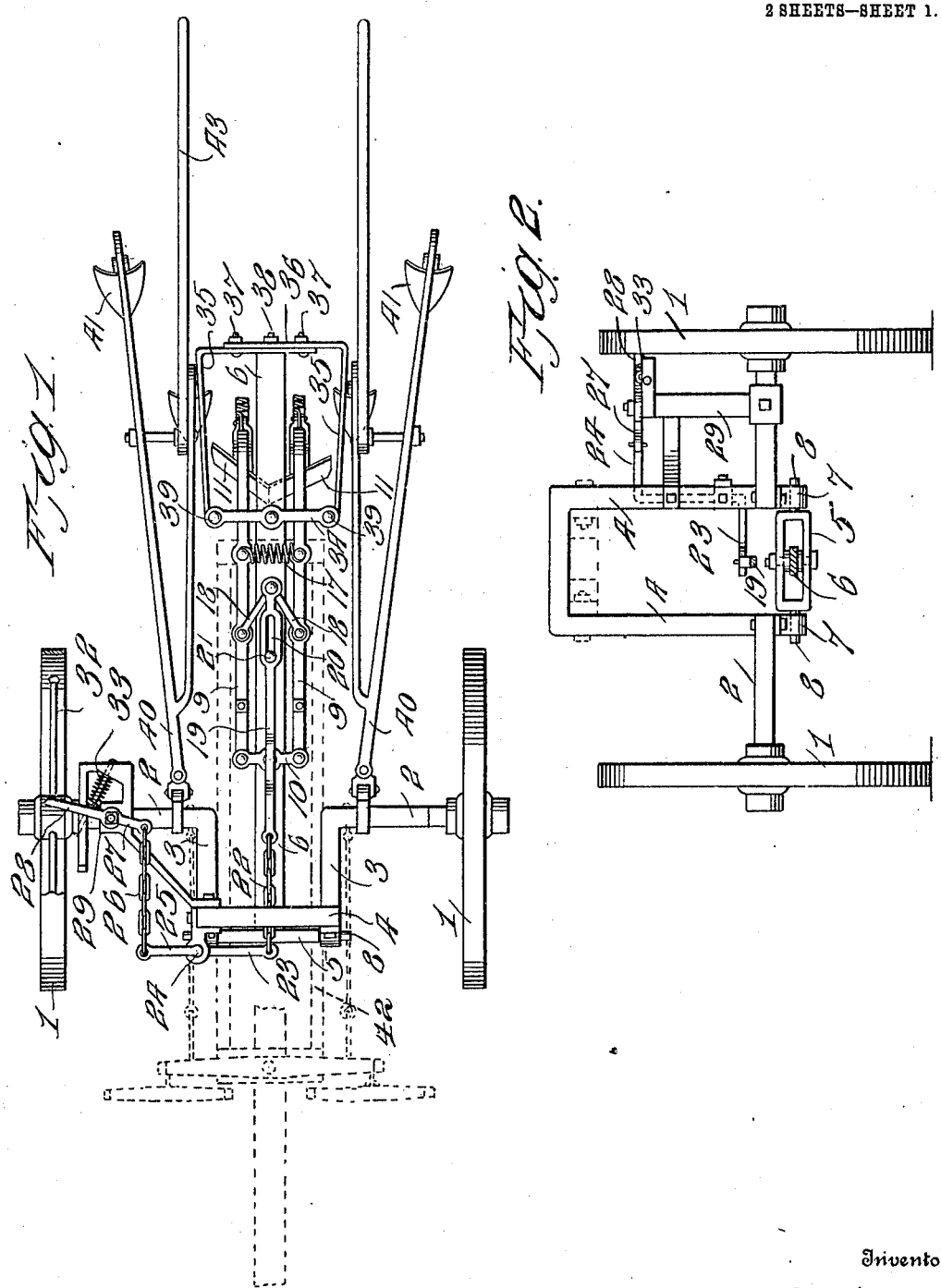

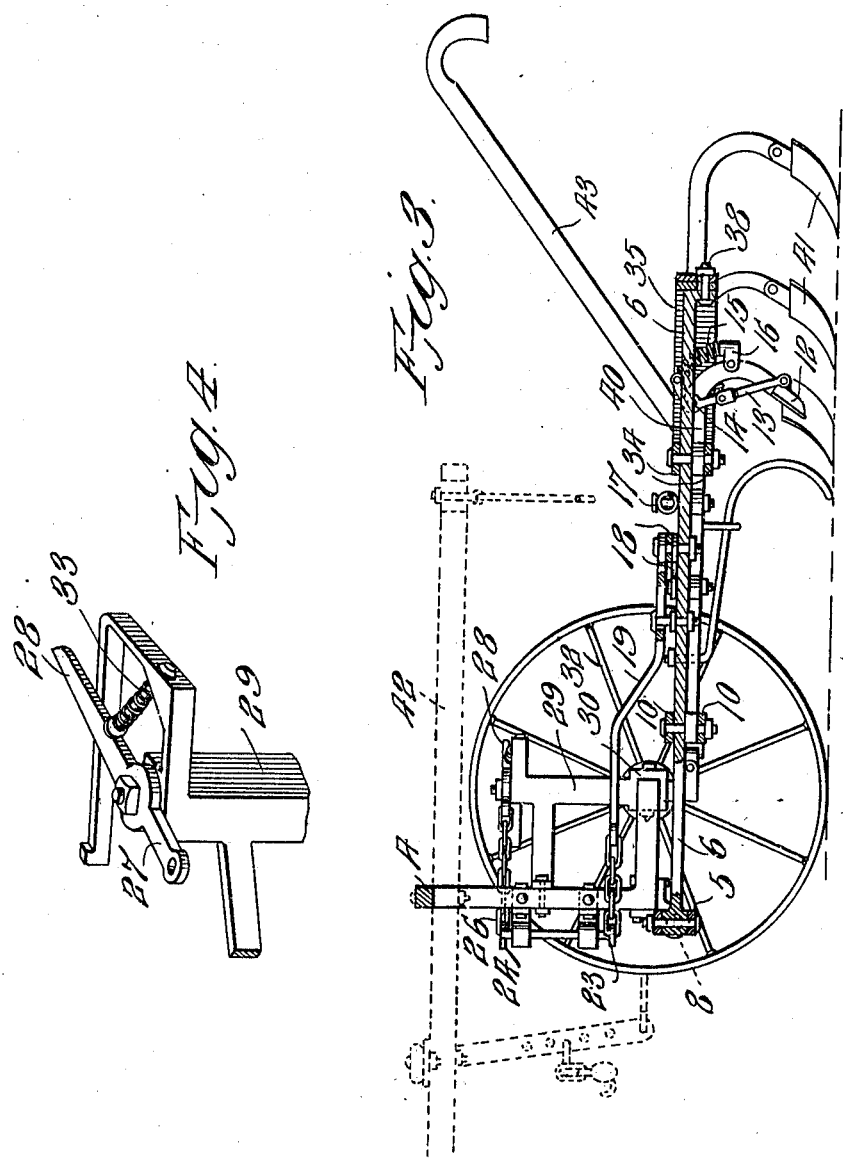

JOHN W. DOTY, OF KELLYVILLE, OKLAHOMA.

COTTON-CULTIVATOR.

952,983.  Specification of Letters Patent.  Patented Mar. 22, 1910.

Application filed November 28, 1908. Serial No. 464,924.

*To all whom it may concern:*

Be it known that I, JOHN W. DOTY, a citizen of the United States, residing at Kellyville, in the county of Creek and State of Oklahoma, have invented new and useful Improvements in Cotton-Cultivators, of which the following is a specification.

This invention relates to cultivators and particularly implements of the class described used for cultivating cotton plants, the object of the invention being to provide a simple and practical machine for cutting or chopping out a certain proportion of the cotton plants in each row, leaving the remaining plants in stands or hills.

The cultivator of this invention is known in the art as a straddle row cultivator and embodies a novel construction and arrangement of scrapers or choppers embodying relatively movable sections which coöperate to remove certain plants and are separated automatically to leave other plants, the entire mechanism of the cultivator being automatic in operation.

With the above and other objects in view the invention consists in the novel construction, combination and arrangement of parts hereinafter described, illustrated and claimed.

In the accompanying drawings:—Figure 1 is a plan view of a cultivator embodying the present invention. Fig. 2 is a vertical cross section through the same. Fig. 3 is a vertical longitudinal section through the cultivator. Fig. 4 is a detail perspective view of the trip lever and its connections.

The cultivator disclosed in this invention is designed to be attached to any ordinary cultivator and to that end it comprises a pair of carrying wheels 1 which are mounted on the opposite ends of an axle 2 which, as shown in Fig. 1, comprises oppositely arranged L-shaped sections, the inner portions 3 of which extend in the direction of travel of the machine and are arranged in parallel relation to each other as shown in Fig. 1. These parallel portions 3 are connected at their forward ends by means of an arch or U-shaped frame piece 4 which is best illustrated in Fig. 2 and they are also connected by means of a stirrup 5 through which passes the forward end portion of the main center beam 6 of the improved cultivator. The forward ends of the portions 3 of the axle are provided with bearings 7 for the reception of trunnions 8 on the stirrup 7 as best illustrated in Fig. 2, and having the forward end of the center beam 6 pivoted therein as shown in Fig. 3.

Arranged at opposite sides of the center beam 6 and normally in parallel relation thereto are scraper beams 9 the same being pivotally connected at their forward ends to a cross head 10 which is centrally secured to the center beam 6. The rear ends of the scraper beams 9 are curved downward and have connected thereto the oppositely arranged sections 11 of the scraper or chopper. The scraper sections 11 are pivotally connected to the rear ends of the beams 9 to adapt them to swing back upon meeting an obstruction and to that end each of said scraper sections is provided on the rear side with a lug 12 to which is pivotally connected a link 13 attached to one arm of a bell crank lever fulcrumed at 14 on the respective scraper beam 9 while the other shorter arm of said bell crank lever has attached thereto one end of a spring 15 the other end of which is connected to a bracket or extension 16 on the scraper beam the arrangement being such that the spring 15 while strong enough to hold the scraper section 11 in its operative position, is also adapted to yield under excessive strain to allow the scraper section to swing back on its pivotal connection with the scraper beam.

The scraper beams 9 are normally held toward each other by means of a contractile spring 17 having its opposite extremities connected to said beams as shown in Fig. 1 in which position the adjacent edges of the scraper sections 11 are in contact with each other thereby giving to the scraper as a whole the form of a broad and V-shaped plow point or shovel as clearly seen in Fig. 1. At suitable intervals in the travel of the cultivator the scraper beams 9 and the scraper sections 11 are spread apart or forced away from each other in opposite directions by means of toggle links 18 connected at their outer ends pivotally to the scraper beams while the inner ends thereof are pivotally connected together and also pivotally attached to the rear extremity of an operating rod 19 provided intermediate its length with a slot 20 through which is inserted a pin 21 carried by the main center beam 6, the length of the slot 20 determining the amount of end movement of the operating rod 19.

Connected to the forward end of the rod 19 is a chain or other flexible element 22 which at its forward end is connected to a crank arm 23 of a vertically disposed rock shaft 24 journaled in bearings secured to one side of the arch 4. On the same rock shaft 24 there is another crank arm 25 from which a flexible connection 26 extends to one arm 27 of an elbow trip lever 28 pivotally mounted on the upper end of a fulcrum post 29 secured at its lower end to the machine axle as shown at 30. The other arm 31 of the elbow lever which in reality constitutes a trip lever is arranged in the path of movement of the spokes 32 of the adjacent carrying wheel 1 while the trip lever is normally held in the position shown in Fig. 1 by means of an expansive spring 33. As the machine moves forward, spokes 32 come in contact with the trip lever 31, rocking the same, and through the connections described, drawing the operating rod 19 forward. This acts upon the toggle links 18 to spread apart the scraper beams 9 and correspondingly separate the meeting edges of the scraper sections 11. It will thus be apparent that during the time the scraper sections are separated, plants will be left standing as the machine moves forward.

The scraper beams lie and operate between upper and lower cross bars 34 secured centrally to the main center beam 6, the bars 34 forming a cross head which acts as a combined support and guide for the scraper beams in their lateral movement. Secured to the opposite ends of the cross head 34 is a U-shaped frame embodying the oppositely arranged sides 35 and the inwardly bent and overlapping rear portions 36 which are bolted together as shown at 37 and also bolted to the rear extremity of the main center beam as shown at 38.

40 designates the cultivating beams provided with plows or shovels 41 which operate between the rows of plants, while 42 designates the frame of an ordinary cultivator to which the cultivating attachment of this invention is adapted to be applied.

43 designates suitable operating handles for directing the path of the machine and causing the same to run in proper alinement with the rows of plants.

From the foregoing description it will be seen that when the scraper sections 11 are in contact with each other as shown in Fig. 1, they act as a plow and remove the plants in their path. Intermittently the scraper sections are caused to separate and at such times they do not plow up or uproot the plants which therefore, remain standing, it being understood that the mechanism is so timed in proportion to the side of the carrying wheels 1 that the requisite number of plants will be left in stands or hills. In backing the machine, the spring 33 yields to allow the trip lever 28 to swing back and permit the spokes 32 to pass by the trip lever.

I claim:—

A cotton cultivator comprising a frame, carrying wheels therefor, a central longitudinal beam, longitudinal scraper beams at opposite sides of and parallel to the center beam, a cross head on the center beam to which the parallel scraper beams are pivotally connected at their forward ends, scraper sections carried directly by said beams and meeting on a common central line, a spring connecting said scraper beams for yieldingly holding the same toward each other and the central beam, and means for spreading said scraper beams apart and separating the scraper sections carried thereby, said means comprising forwardly diverging toggle links, an operating connection associated with said links, and a mechanical device for intermittently actuating the link operating element.

In testimony whereof I affix my signature in presence of two witnesses.

JOHN W. DOTY.

Witnesses:
LUM RAGSDELL,
R. E. SCOTT.